United States Patent
Drucker et al.

(10) Patent No.: US 11,074,530 B1
(45) Date of Patent: Jul. 27, 2021

(54) SYSTEMS AND METHODS FOR IMPROVED PROJECT MANAGEMENT

(71) Applicant: Wells Fargo Bank, N.A., San Francisco, CA (US)

(72) Inventors: Abraham Drucker, San Francisco, CA (US); Khushbu Katariya, San Francisco, CA (US); Timothy R. Knowlton, Mill Valley, CA (US); Shelby K. Morita-Fowler, San Francisco, CA (US); Brian M. Pearce, Pleasanton, CA (US); Dana Roytenberg, San Francisco, CA (US); John T. Wright, Benicia, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 126 days.

(21) Appl. No.: 16/229,384

(22) Filed: Dec. 21, 2018

(51) Int. Cl.
*G06Q 10/06* (2012.01)
*G06Q 40/00* (2012.01)

(52) U.S. Cl.
CPC ......... *G06Q 10/06313* (2013.01); *G06Q 10/063114* (2013.01); *G06Q 40/12* (2013.12)

(58) Field of Classification Search
None
See application file for complete search history.

(56) References Cited

U.S. PATENT DOCUMENTS

| | | | |
|---|---|---|---|
| 6,038,547 A | 3/2000 | Casto | |
| 7,089,203 B1 | 8/2006 | Crookshanks | |
| 7,321,864 B1 | 1/2008 | Gendler | |
| 7,774,324 B1 * | 8/2010 | Henderson | G16H 40/67 707/701 |
| 7,925,584 B2 | 4/2011 | Allin et al. | |
| 8,306,883 B2 | 11/2012 | Allin et al. | |
| 8,346,582 B1 | 1/2013 | Davis et al. | |

(Continued)

FOREIGN PATENT DOCUMENTS

WO   WO-2008014259 A2 *   1/2008   ......... G07F 17/0014

OTHER PUBLICATIONS

Kangari, R. (n.d.). Strategic directions for construction project management information systems. Proceedings of Engineering Management Society Conference on Managing Projects in a Borderless World. doi:10.1109/iemc.1993.316493 (Year: 1993).*

*Primary Examiner* — Matthew S Gart
*Assistant Examiner* — Tiera J Fletcher
(74) *Attorney, Agent, or Firm* — Foley & Lardner LLP

(57) ABSTRACT

A method for managing a budget includes determining, by a budget management system, funds of a project management account that are to be routed to a task manager for a project. The determining comprises: determining a current progress of a task managed by the task manager, the task included in a budget for the project that identifies the task manager and that includes payment information for the task manager that specifies a financial account, determining an amount owed to the task manager, and setting the amount owed to the task manager as the amount of the funds to be routed to the task manager. The method further comprises transmitting, by the budget management system to a financial computing system, a request to transfer the determined funds to the financial account specified by the payment information.

12 Claims, 7 Drawing Sheets

(56) References Cited

U.S. PATENT DOCUMENTS

| | | |
|---|---|---|
| 8,412,618 B2 | 4/2013 | Robertson et al. |
| 9,152,934 B2 | 10/2015 | Carlson et al. |
| 9,317,886 B2 | 4/2016 | Labuszewski et al. |
| 2002/0103755 A1 | 8/2002 | Jorgensen |
| 2003/0225683 A1 | 12/2003 | Hill et al. |
| 2005/0216400 A1 | 9/2005 | Doyle et al. |
| 2008/0288364 A1* | 11/2008 | Harris .................. G06Q 20/10 705/26.3 |
| 2011/0185305 A1* | 7/2011 | Lai ........................ G06F 40/18 715/772 |
| 2011/0213631 A1 | 9/2011 | Mislavsky |
| 2012/0109794 A1* | 5/2012 | Nathanson ............ G06Q 40/12 705/32 |
| 2013/0138562 A1 | 5/2013 | Yoo |
| 2014/0100947 A1* | 4/2014 | Kitts ................ G06Q 30/0246 705/14.45 |
| 2015/0006393 A1 | 1/2015 | Allin et al. |
| 2016/0321614 A1* | 11/2016 | Leslie .............. G06Q 10/06398 |
| 2018/0114178 A1* | 4/2018 | Asokan .......... G06Q 10/063118 |
| 2019/0205803 A1* | 7/2019 | Maie ...................... G06F 1/163 |

* cited by examiner

SYSTEMS AND METHODS FOR IMPROVED PROJECT MANAGEMENT

TECHNICAL FIELD

Embodiments of the present disclosure relate generally to the field of budget management.

BACKGROUND

Budget management between multiple parties involved in a project can involve certain challenges, including transferring funds to appropriate parties according to predetermining payment rules, at predetermined times, or when predetermined benchmarks are reached. Furthermore, providing relevant information to the relevant parties without the parties having go through a burdensome process to retrieve the information can be challenging.

SUMMARY

One example embodiment relates to a method for managing a budget. The method includes determining, by a budget management system, funds of a project management account that are to be routed to a task manager for a project. The determining includes determining a current progress of a task managed by the task manager, the task included in a budget for the project that identifies the task manager and that includes payment information for the task manager that specifies a financial account, determining an amount owed to the task manager, and setting the amount owed to the task manager as the amount of the funds to be routed to the task manager. The method further comprises transmitting, by the budget management system to a financial computing system, a request to transfer the determined funds to the financial account specified by the payment information.

Another example embodiment relates to a method for managing a budget. The method for managing a budget includes generating, by a project management system, a first graphical user interface (GUI) configured to display a first task progress gauge for a first task of one or more tasks of a budget, the first task progress gauge including a display of a current progress of the first task and a progress submission object configured to receive a proposed progress for the first task, and receiving, by the project management system via the progress submission object of the first GUI, the proposed progress. The method further includes generating, by the project management system, a second GUI configured to display a second task progress gauge for the first task, the second task progress gauge including a display of the current progress of the first task and a display of the proposed progress, and further including a confirmation object configured to receive confirmation of the proposed progress. The method yet further includes receiving, by the project management system via the confirmation object, confirmation of the proposed progress for the first task, setting, by the project management system, the proposed progress as an updated current progress for the first task, and generating, by the project management system, an invoice based on the updated current progress for the first task.

Another example embodiment relates to a system for managing a budget. The system for managing a budget a GUI management circuit configured to: generate a first GUI configured to display a first task progress gauge for a first task of a budget that includes one or more tasks, the first task progress gauge including a display of a current progress of the first task and a progress submission object configured to receive a proposed progress for the first task, and receive, via the progress submission object of the first GUI, the proposed progress. The GUI management circuit is further configured to generate a second GUI configured to display a second task progress gauge for the first task, the second task progress gauge including a display of the current progress of the first task and a display of the proposed progress, and further including a confirmation object configured to receive confirmation of the proposed progress, and receive confirmation of the proposed progress for the first task. The system further includes a budget management circuit configured to set the proposed progress as an updated current progress for the first task, and generate an invoice based on the updated current progress for the first task.

Various objects, aspects, features, and advantages of the disclosure will be readily understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
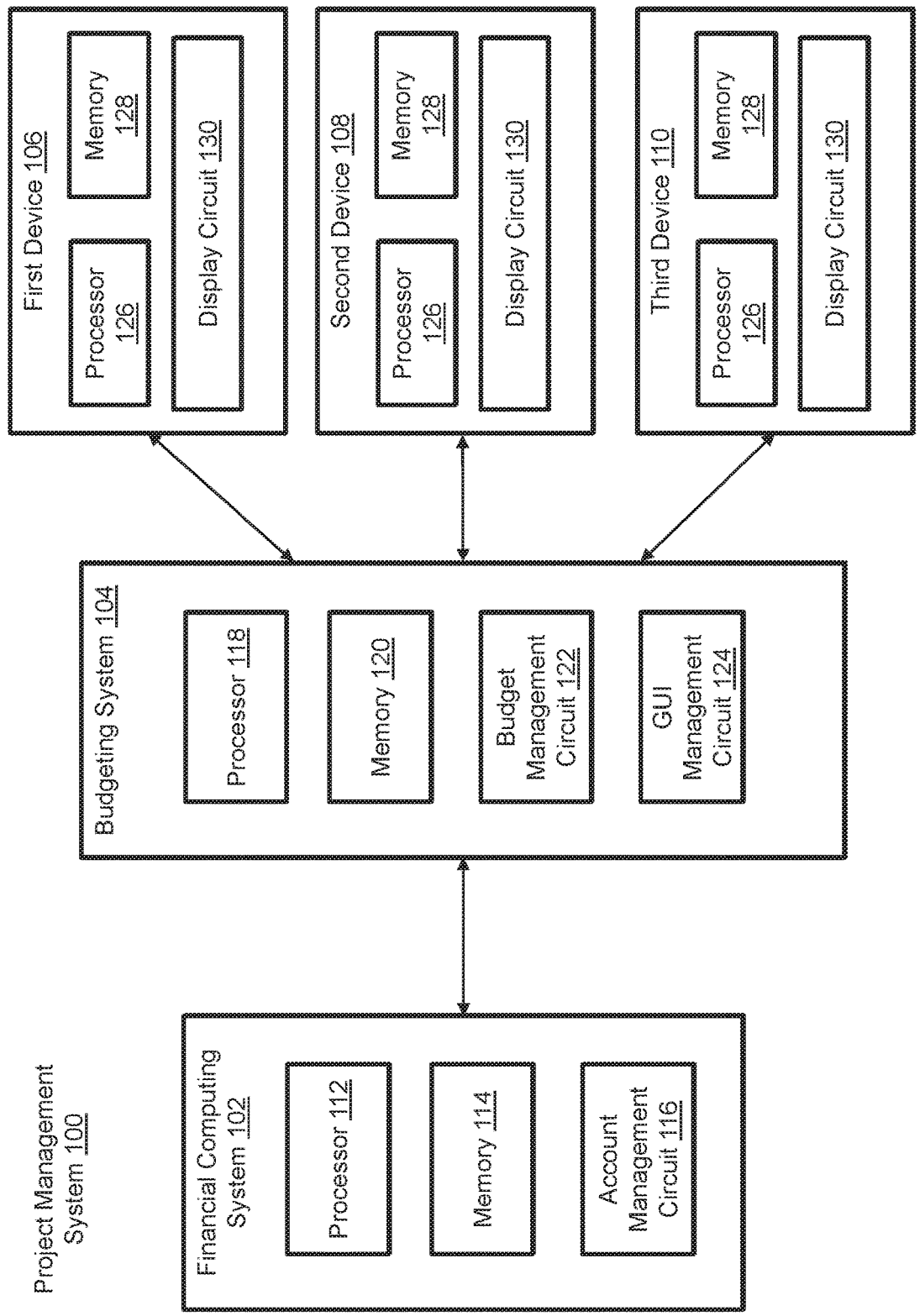
FIG. 1 is a schematic diagram of a budget management system, according to an example embodiment.

Various systems, methods, and apparatuses for facilitating budget management are described herein. For example, the systems, methods, and apparatuses can be used to transfer funds to appropriate parties according to predetermining payment rules, at predetermined times, or when predetermined benchmarks are reached, and can be used to track progress of projects and funds distributed to various parties involved in the projects. For example, the systems, methods, and apparatuses can be used by a general contractor (GC), a subcontractor (SC), and a director or payor who has hired the general contractor to perform a job that includes one or more tasks. Certain payments may be made by the director (e.g. a home owner who has hired the GC) to the GC or into an account for the project, and it can be difficult for the GC to route the payments appropriately to the relevant parties. For example, it can be complicated for the GC to make payments according to certain progress having been made (which can involve regularly updated tracking for progress being made on multiple tasks of complex projects), and/or the GC may want to route a stipulated portion of the funding provided by the director to the appropriate SC(s). It can be difficult for the GC to track progress on tasks being performed by one or more SCs, to route funds as appropriate over the course of the job from the director to the SCs, and to provide relevant information about the job to the director and the SCs. Use of conventional legers (both analogue and digital) can involve using documentation and interfaces that are difficult to navigate, and often relevant information will be missed, will not be provided to the appropriate parties in a timely manner, and/or the GC must expend considerable effort to ensure that information management is handled correctly. The systems, methods, and apparatuses described herein improve on such conventional ledgers by providing for determining when, how, and/or to whom payments should be routed for a project (e.g. a project involving multiple jobs and tasks), and implementing those payments in a convenient fashion. Furthermore, the systems, methods, and apparatuses described herein improve on such conventional ledgers by providing for GUIs with specific components that function in user-specific environments to alleviate the burdens described above, to better track progress of certain tasks, to better provide relevant information to the appropriate parties, and to route funds as appropriate in a timely manner. For example, as described herein in more detail, the GC, the SCs, and the director may respectively have access to different GUIs that may be formatted by the GC for an improved user experience. The GUIs implement a "task progress gauge" and other components, described in detail herein, to achieve an improved user experience. These improvements can help to ensure that progress is tracked, funds are directed as appropriate, and all parties involved have ready access to the information that they need or desire.

Referring now to FIG. 1, an illustration of a project management system 100 is shown according to an example embodiment. The project management system 100 can be implemented to facilitate project and budget management, to track progress of jobs and tasks, and to route funds as appropriate. The project management system 100 includes a financial computing system 102, a budgeting system 104, a first device 106, a second device 108, and a third device 110. Any of these components may be configured (e.g. via one or more network interfaces) to connect to each other and/or to an external device via a network. The network can provide communicable and operative coupling between the financial computing system 102, the budgeting system 104, the first device 106, the second device 108, and the third device 110, and other components disclosed and described herein, to provide and facilitate the exchange of communications (e.g., data, instructions, requests, messages, values, commands). Accordingly, the network may include any network including wired (e.g., Ethernet) and/or wireless networks (e.g., 802.11X, ZigBee, Bluetooth, WiFi). In some embodiments, the network includes the Internet. In further embodiments, the network includes a proprietary banking network that can provide secure or substantially secure communications.

In some embodiments, the financial computing system 102 includes a computing system of a financial institution (e.g. of a bank, a credit provider, or another financial service provider). The financial computing system 102 may route funds between two or more financial accounts, and/or may route charges or invoices to appropriate parties. For example, the financial computing system 102 may debit a first financial account and may credit, or cause another system to credit, a second financial account. The financial accounts may include checking accounts, credit accounts, or savings accounts, or any other type of financial account. The financial computing system 102 may perform financial transactions requested by the budgeting system 104, including routing of funds for a project or task included in a budget being managed by the budgeting system 104.

The financial computing system 102 may include a processor 112, a memory 114, and an account management circuit 116. The processor 112 may include one or more microprocessors, application-specific integrated circuits (ASIC), a field-programmable gate arrays (FPGA), etc., or combinations thereof. The memory 114 may include, but is not limited to, electronic, magnetic, or any other storage or transmission device capable of providing processor with program instructions. The memory may include magnetic disk, memory chip, read-only memory (ROM), random-access memory (RAM), Electrically Erasable Programmable Read-Only Memory (EEPROM), erasable programmable read only memory (EPROM), flash memory, or any other suitable memory from which a processor can read instructions. The memory 114 may include components, subsystems, data structures, modules, scripts, applications, or one or more sets of processor-executable instructions for implementing management of a financial account, including any processes described herein. The account management circuit 116 may be configured to access the memory 114, and to implement financial transactions such as debiting, crediting, and/or routing of funds from financial accounts. The account management circuit 116 may receive and implement transaction requests from the budgeting system 104. The account management circuit 116 may also implement certain security measures, such as verification of credentials received along with, or in parallel to, the transaction requests.

In some embodiments, the budgeting system 104 may include a budget management system for managing the budget 202. The budgeting system 104 may include a processor 118, a memory 120, a budget management circuit 122, and a GUI management circuit 124. The budgeting system 104 may provide for tracking progress, routing funds as appropriate, and providing ready access to relevant information to concerned parties. The budgeting system 104 provides for these solutions by using a specific budget management circuit 122 (described in detail below), and by providing specific GUIs using a specific GUI management circuit 124 (described in detail below).

The processor 118 may include one or more microprocessors, application-specific integrated circuits (ASIC), a field-programmable gate arrays (FPGA), etc., or combinations thereof. The memory 120 may include, but is not limited to, electronic, magnetic, or any other storage or transmission device capable of providing processor with program instructions. The memory may include magnetic disk, memory chip, read-only memory (ROM), random-access memory (RAM), Electrically Erasable Programmable Read-Only Memory (EEPROM), erasable programmable read only memory (EPROM), flash memory, or any other suitable memory from which a processor can read instructions. The memory 120 may include components, subsystems, data structures, modules, scripts, applications, or one or more sets of processor-executable instructions for implementing management of a financial account, including any processes described herein. The budget management circuit 122 and the GUI management circuit 124 may be configured to access the memory 120 to perform operations described herein.

Figure 2C:
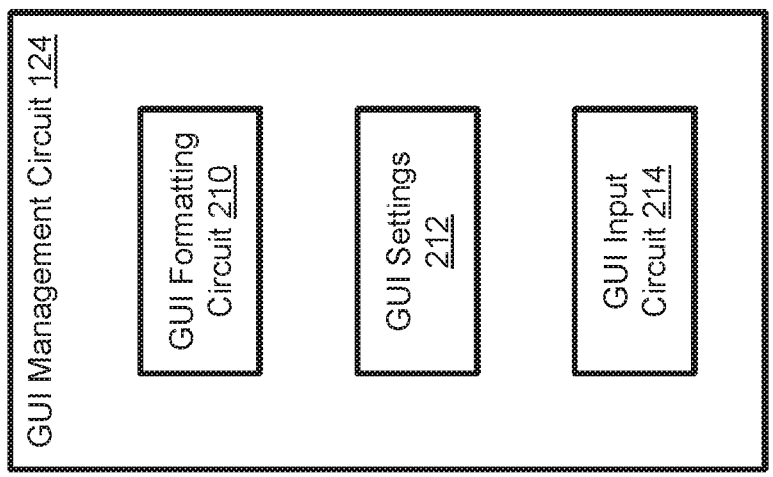
FIG. 2C is a schematic diagram of a GUI management circuit of the budget management system, according to an example embodiment.
Figure 2B:
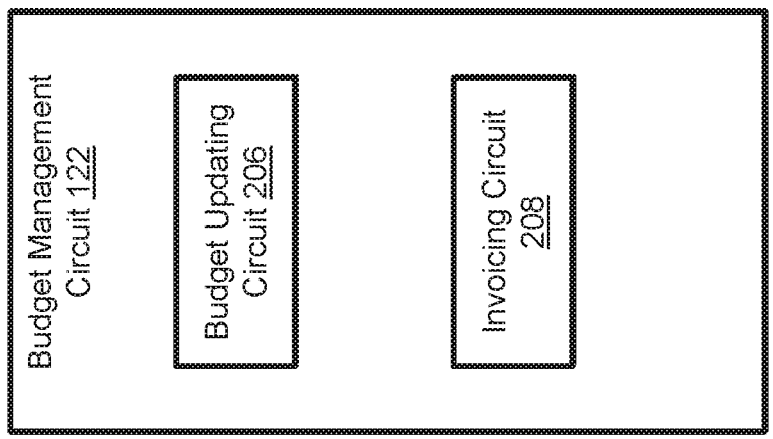
FIG. 2B is a schematic diagram of a budget management circuit of the budget management system, according to an example embodiment.
Figure 2A:
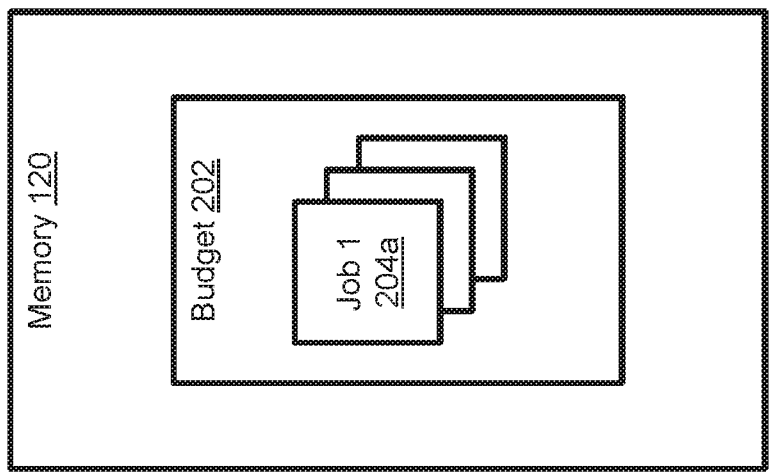
FIG. 2A is a schematic diagram of a memory of the budget management system, according to an example embodiment.

The memory 120 may store or include a budget 202, an example implementation of which is shown in FIG. 2A. The budget 202 may specify or include, among other things, monetary considerations, work or task distribution (and progress thereof), timelines or tasks for payments, benchmarks (e.g. for payments, pre-arranged or otherwise, or for check-ins or reports), contracts or agreements relating to the above. For example, the budget may be for a construction project, and may refer to an agreement for certain parties to complete (either directly or indirectly (such as via subcontracting)) certain jobs or tasks for a certain monetary amount, according to a certain timeline.

The budget 202 may include a plurality of jobs 204, including jobs 204a through 204n. The jobs 204 may specify or include a plurality of tasks, which can specify work to be completed, or goods or services to be rendered. For example, the job 204a may be a construction job, and the tasks of the job 204a may include work to be done for the job, including electrical, painting, plumbing, wiring, drywall, and other work. Each job 204 may be associated with a job identifier (ID), and each task may be associated with a task ID. The tasks may include subtasks. For example, a drywall task may include subtasks for labor and supplies. In other embodiments, both labor and supplies may be included in a single task. The tasks may also include or specify task information. For example, the task information may include a current progress, a proposed progress, an amount spent, and an amount paid.

The current progress of a task may indicate work completed (or treated as substantially completed) or supplies or other goods and/or services bought for the task (e.g. an amount spent on the goods or services). The current progress may be progress that has been confirmed by a supervising party (e.g. a manager, such as a GC). The current progress may indicate a confirmation status that indicates whether the current progress has been confirmed. The confirmation status may also indicate who confirmed the progress (e.g. via a manager ID or an employee ID for an employee of the manager, or other party working with or for the manager), and when the confirmation occurred (e.g. via a time stamp). This can provide for review of submission of proposed progress reports and confirmation of validation of the reports, which can help to identify parties that submit often-rejected proposed progress reports, or parties that validate poor quality proposed progress reports.

The proposed progress may indicate a proposed update or status for the progress of the task. The proposed progress may be submitted by a task manager (e.g. an SC) working on a task or assigned to a task, and may indicate a progress that has not yet been confirmed, or that has not yet been confirmed by all parties required for confirmation. For example, as described in more detail below, an SC may submit a proposed progress report or update for a task to a GC for confirmation. In some embodiments, the current progress is not immediately updated to reflect or match the proposed progress unless and until all confirming parties have confirmed the proposed progress.

The amount spent may indicate an amount of funds that have been paid out for the task. For example, the amount spent may indicate an amount of funds paid by an SC to a third party (e.g. a party other than the GC and other than the director) for supplies or services related to the task, or an amount spent by the GC. The amount spent may be specific to spending that is subject to reimbursement by the director or the GC. The amount spent may be for goods or services specified in an agreement between the SC and the GC. The amount spent may be only for goods or services that are to be reimbursed via the GC, as per the agreement. The amount spent may be capped at a certain amount specified in the agreement.

In some embodiments, the job 204a may include or specify a proposed amount spent. Similarly to the proposed progress, the proposed amount spent may indicate a proposed update or status for the amount spent. The proposed amount spent may be submitted by a task manager (e.g. an SC) working on a task or assigned to a task, and may indicate an amount spent that has not yet been confirmed, or that has not yet been confirmed by all parties required for confirmation. For example, as described in more detail below, an SC may submit a proposed spending report or update for a task to a GC for confirmation. In some embodiments, the current amount is not immediately updated to reflect or match the proposed amount spent unless and until all confirming parties have confirmed the proposed amount spent.

The amount paid may indicate an amount of funds that was reimbursed or paid in advance by the director or the GC, and may indicate an amount of funds that was transferred to the GC or SC. The amount paid may indicate an amount of funds that has been debited from an account of the director. As described in more detail below, an amount owed may be calculated by the budget management circuit 122 based on a difference between the amount paid and the amount spent.

The jobs 204 may also include timelines and benchmarks for tasks of the jobs 204. For example, the timelines may include reporting schedules for progress of the tasks that indicate when proposed progress can or should be submitted, and the GUI management circuit 124 may transmit or generate an alert or notification at scheduled reporting times (e.g. for an SC to submit a report, or as a reminder to the GC to check that a report has been submitted). The timelines may also include timelines for payments (e.g. payments to the SC or the GC). The benchmarks may include progress benchmarks at which a report is expected, or at which payments will be triggered. A set of benchmarks for a task may also be used to set "proposed progress points" that a user of a GUI (e.g. the SC) can propose—thus, in some embodiments the user can submit a proposed progress for any arbitrary amount or percentage of task completed, and in some embodiments the user can only submit a proposed progress at certain benchmarks (e.g. predetermined benchmarks or benchmarks set by another GUI user, such as the GC). The progress benchmarks may include a set of benchmarks such as 0%, 25%, 50%, 75%, and 100%, or any other appropriate set of benchmarks, that can be used as a trigger for a duty or responsibility to submit a report, or that can be used to trigger a payment.

Thus the jobs 204 may indicate tasks that are included in the job, identities of parties assigned to or responsible for the tasks, and task information including a current progress, a proposed progress, an amount spent, and an amount paid, among other things. The jobs 204 may be included in the budget 202 managed by the budget management circuit 122.

The budget management circuit 122 may be configured to manage a budget 202 of one or more projects, and can be used to track and update any aspect of the budget 202, including, among other things, assignment of jobs and tasks, estimated costs, agreed upon payments, timelines and benchmarks, progress of tasks, costs of particular items, and amounts paid out. A detailed schematic of an example budget management circuit 122 is shown in FIG. 2A. The budget management circuit 122 includes a budget updating circuit 206 and an invoicing circuit 208.

The budget updating circuit 206 can be configured to update, make changes to, delete information from, or otherwise manage the budget 202. The budget updating circuit 206 may update, make changes to, or delete information from the jobs 204 of the budget 202. Thus task information including current progress, a proposed progress, an amount spent, and an amount paid can be created or revised as appropriate.

The budget updating circuit 206 can be configured to receive information, such as task information, via one or more GUIs managed by the GUI management circuit 124. For example, the first device 106 can be configured to display a first GUI provided by the GUI management circuit 124, and a user of the first GUI can input changes or propose changes to the task information of the job 204*a*, including setting or confirming progress, amounts spent, and/or amounts paid. The budget updating circuit 206 can generate, update, or change the job 204*a* based on the received information, thus providing for external management of the budget 202 via one or more GUIs. In some embodiments, a user of the first GUI can transmit information to the budget management circuit 122 including initial parameters and values for generating a budget or jobs, and the budget updating circuit 206 can use that information to generate the budget 202 or the job 204*a*. As described in more detail below, one or more GUIs managed by the GUI management circuit 124 may selectively provide specific information used by the budget management circuit 122 to generate or update the budget, and the one or more GUIs may selective display information generated or updated by the budget management circuit 122.

The invoicing circuit 208 may be configured to generate or modify an invoice relating to the budget 202. For example, the invoicing circuit may generate an invoice for an amount owed for a job 204 of the budget 202 based on, for example, a difference between an amount spent and an amount paid, or based on a predetermined payment schedule. The invoicing circuit 208 may monitor (e.g. by checking at predetermined intervals) a timeline of one or more of the jobs 204, and may generate or determine to transmit an invoice based on the timeline (e.g. based on scheduled payment times specified by the timeline). The invoicing circuit 208 may also monitor benchmarks of the one or more jobs 204, and may generate or determine to transmit an invoice based on a benchmark having been reached. In some embodiments, the budget updating circuit 206 informs the invoicing circuit 208 when a benchmark has been reached (e.g., the budget updating circuit 206 determines whether a benchmark has been reached each time a progress update is made, and if so, informs the invoicing circuit), and the invoicing circuit 208 responsively generates an appropriate invoice.

The invoicing circuit 208 may perform certain notification operations including generating an invoice. Including generating an invoice may include generating or transmitting (e.g. for notification via a GUI) a notification that a payment is due. For example, the invoicing circuit 208 may determine that a payment is due to an SC from the GC, and may inform the GC (and, optionally, the SC). The invoicing circuit 208 may determine that a payment is due to the GC from the director and may inform the GC and director. The invoice may include or specify an amount owed, specifics about the task or progress of the task for which payment is due, supplies or other goods or services that were purchased or will be purchase and for which payment is due, and/or notes from the GC or SC regarding the payment or the task or task progress for which the payment is due.

The invoicing circuit 208 may perform certain payment resolution operations including transferring funds, or causing funds to be transferred, to resolve the payment. The invoicing circuit 208 may receive approval to pay the invoice (e.g. from the GC or from the director via a GUI). The approval may include payment information (such as an account number) and/or security credentials that can be checked (either by the budgeting system 104 or by the financial computing system 102) to implement a security protocol. In some embodiments, the invoicing circuit 208 may receive the approval from a party, and may retrieve account information corresponding to the party (e.g. financial account information, or user information for a financial account). The invoicing circuit 208 may transmit a financial transaction request to the financial computing system 102 for processing by the account management circuit 116, the financial transaction request including any of the payment information, the security credentials, the account information, or a party identification, as well as payment information including an amount of funds to be transferred, account information for an account to be debited, account information for an account to be credited, and fund routing information. The account management circuit 116 may implement the requested transaction and notify the invoicing circuit 208, which may in turn transmit a notification or resolution of the invoice to appropriate parties (e.g. via a GUI).

The GUI management circuit 124 may be configured to generate, manage, and provide one or more GUIs to external devices, such as the first device 106, the second device 108, and the third device 110. The GUI management circuit 124 may selective provide specific GUIs to the devices 106, 108, and 110 to provide for an improved user experience. For example, the first device 106 may be operated or used by a GC, the second device 108 may be operated or used by an SC, and the third device 110 may be operated or used by a director, and the GUI management circuit 124 may provide different GUIs to the three devices, or may selective provide appropriate GUIs to the devices.

Figure 3:
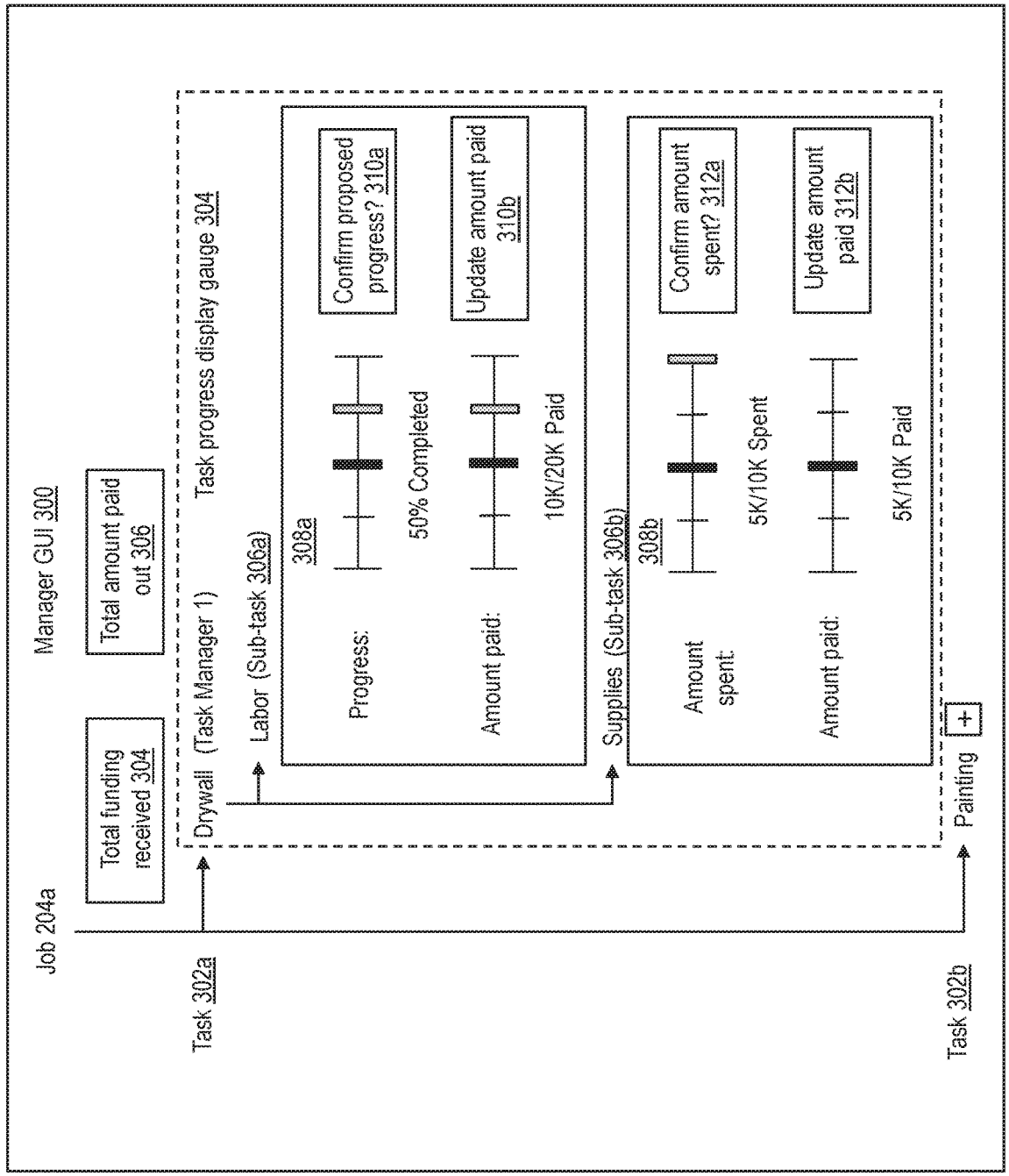
FIG. 3 is a schematic diagram of a first GUI, according to an example embodiment.
Figure 4:
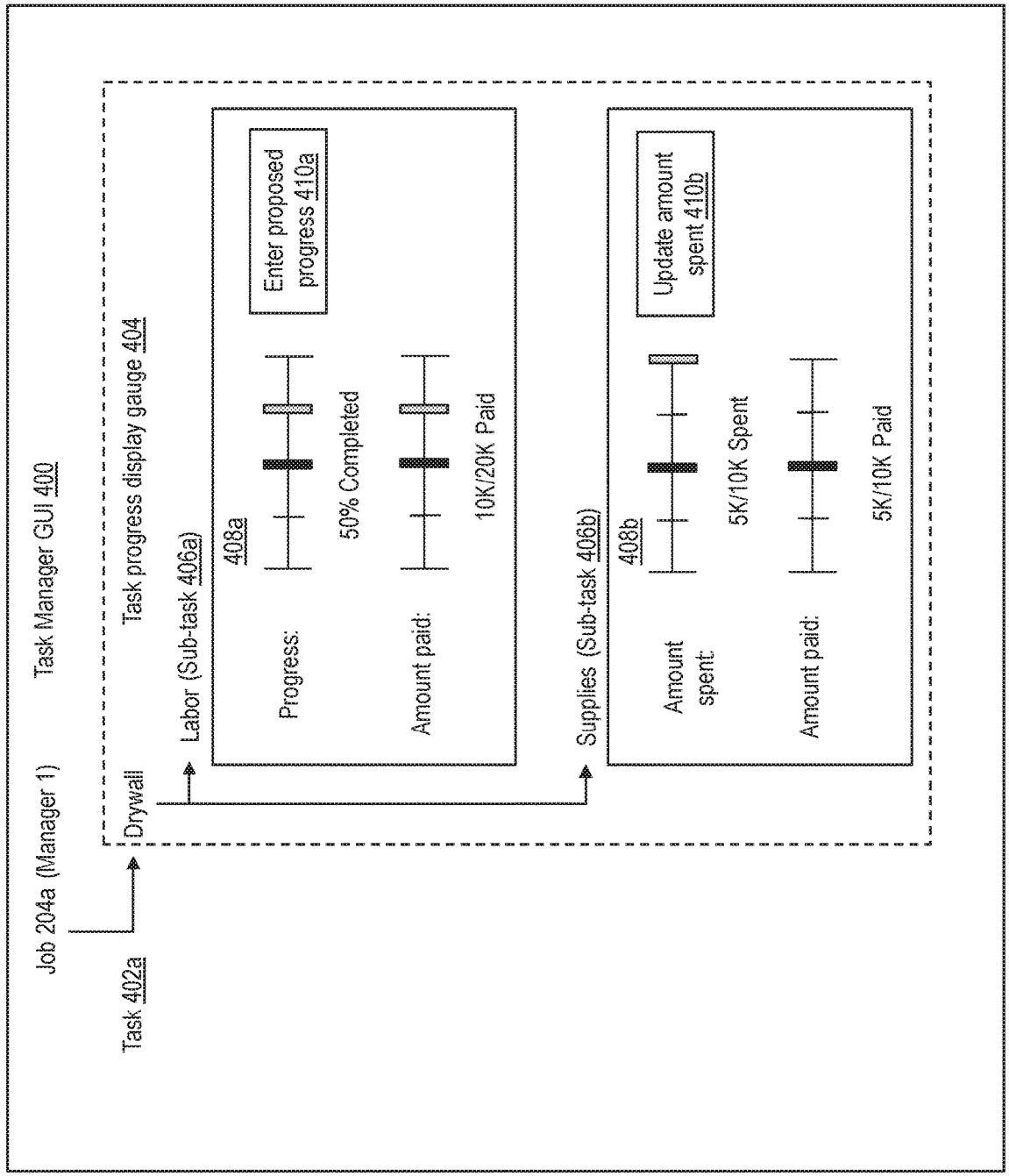
FIG. 4 is a schematic diagram of a second GUI, according to an example embodiment.
Figure 5:
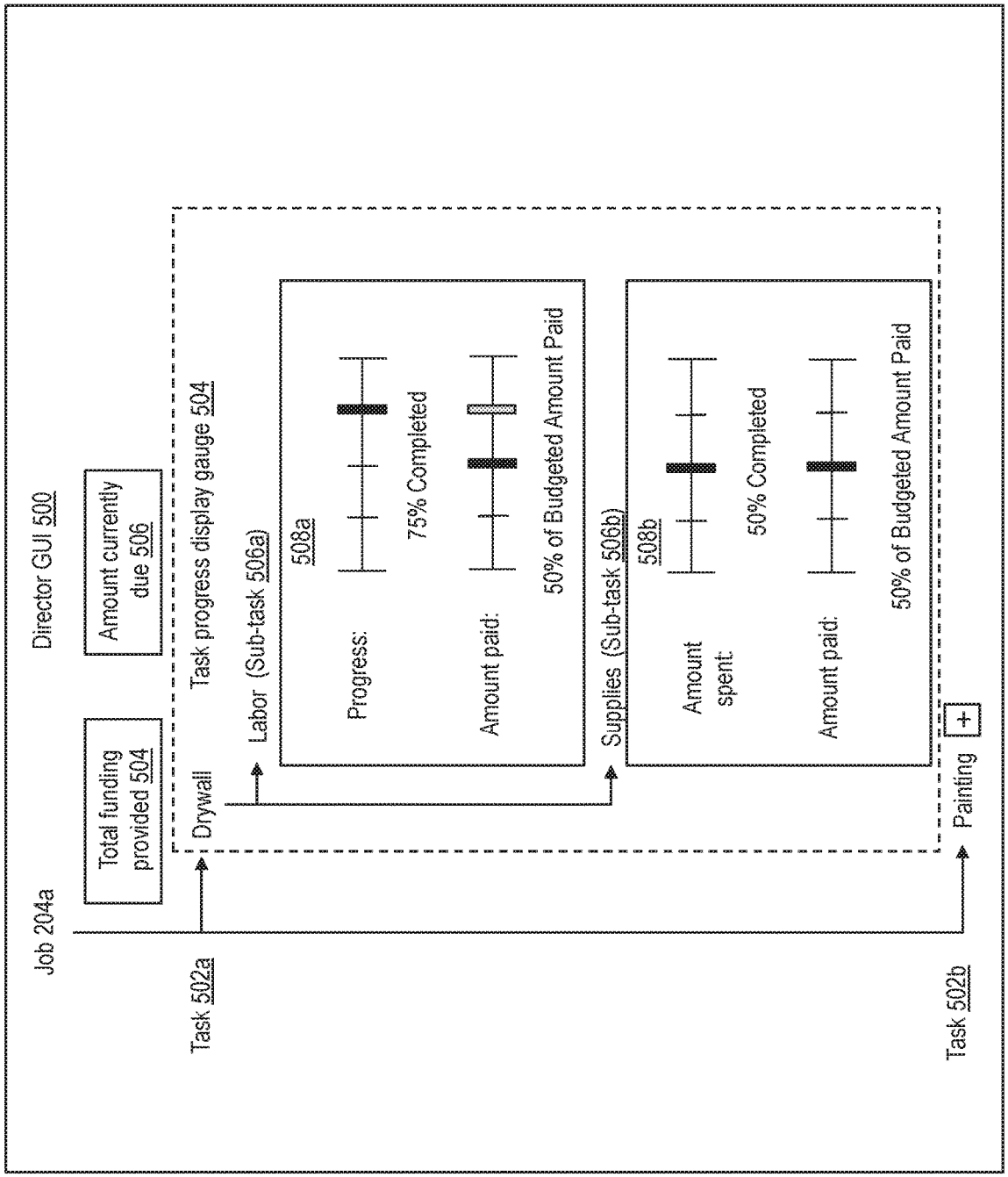
FIG. 5 is a schematic diagram of a third GUI, according to an example embodiment.

FIG. 3, FIG. 4, and FIG. 5 show example implementations of GUIs provided by the GUI management circuit 124. FIG. 3 shows a manager GUI 300 (e.g. suitable for use by a GC), FIG. 4 shows a task manager GUI 400 (e.g. suitable for use by an SC), and FIG. 5 shows a director GUI 500 (e.g. suitable for use by a director). The GUI management circuit 124 may configure the GUIs 300, 400, and 500, may transmit information to an appropriate device for display of the GUIs 300, 400, and 500, and may receive information from the devices via the GUIs 300, 400, and 500 (e.g. information input to the GUIs via selectable objects or input fields of the GUIs). The GUI management circuit 124 may also manage settings and parameters for the GUIs.

FIG. 2C shows an example implementation of the GUI management circuit 124. In the depicted example, the GUI management circuit 124 includes a GUI formatting circuit 210, GUI settings 212, and a GUI input circuit 214. The GUI settings 212 may include memory storing information related to settings for GUIs to be provided by the GUI management circuit 124, including electronic, magnetic, or any other storage or transmission device capable of providing processor with program instructions. The memory may include magnetic disk, memory chip, read-only memory (ROM), random-access memory (RAM), Electrically Erasable Programmable Read-Only Memory (EEPROM), erasable programmable read only memory (EPROM), flash memory, or any other suitable memory from which a processor can read instructions. In some embodiments, the GUI settings 212 are accessible to the GUI management circuit 124, but need not be included in the GUI management circuit 124. In some embodiments, the GUI settings 212 are stored in the memory 120 of the budgeting system 104. The GUI settings may specify components to be included or omitted in the GUIs, a layout of the GUIs, a style of display of the GUIs, other formatting settings, or any information used by the GUI management circuit 124 to generate, format, or provide the GUIs.

The GUI settings 212 may be determined, set, updated, modified, or generated by the GUI formatting circuit 210. The GUI formatting circuit 210 may determine parameter values for parameters that configure the format of a GUI to be provided by the GUI management circuit 124, including formatting of the GUIs 300, 400, and 500 shown in FIG. 3, FIG. 4, and FIG. 5. The GUI formatting circuit 210 may provide, directly or indirectly (e.g. via a remote server) the GUIs for display on external devices, including the first device 106, the second device 108, and the third device 110. In some embodiments, the GUIs formatted by the GUI formatting circuit 210 are provided via an application ("app") and/or an app server. In some embodiments, the GUIs formatted by the GUI formatting circuit 210 are provided via a webpage downloadable by a browser executing on the first device 106, the second device 108, or the third device 110. In some embodiments, the GUI formatting circuit 210 may determine information for display via a GUI based on a job 204. For example, in some embodiments, the GUI formatting circuit 210 can determine or update a current progress of the job 204a by comparing a confirmed progress to one or more benchmarks of the job 204a, determining a highest benchmark of the one or more benchmarks that has been met by the confirmed progress, and setting a to-be-displayed current progress as the highest benchmark that has been met. Thus, for example, if the job 204a has progress benchmarks of 0%, 25%, 50%, 75%, and 100%, and a confirmed progress is 60%, the GUI formatting circuit 210 may set the to-be-displayed current progress at 50%. This process may provide for displaying progress in a more simplified, readily digestible manner. This process may also allow a party proposing a progress to be less concerned about timely submission of progress reports when the progress is progress between two adjacent benchmarks, on the understanding that such progress may be too small or too incremental to be reflected in a GUI viewed by a supervising party—thus, the party submitting the progress reports may have more flexibility in submitting reports and may have a clear understanding of when and in what circumstances progress reports should be submitted.

The GUI input unit 214 may be configured to receive and process information input to the GUIs 300, 400, and 500, and transmitted to the GUI management circuit 124. The GUI input unit may receive an indication that selectable objects of the GUIs have been selected, that certain inputs have been entered, or that certain requests have been made via the GUIs. The GUI input unit 214 can receive such information, process it, and route it as appropriate to components of the budgeting system 104 described herein. The GUI input unit 214 may receive inputs via budget adjustment objects of the GUIs. A budget adjustment object may be any object of a GUI that provides for submitted, setting, confirming, or proposing any update, adjustment, change, or initialization of data (e.g. parameter values) for the budget 202. The GUI input circuit 214 may also receive from a GUI (e.g. from the GUI 300) changes or initialization requests for the GUI settings 212. This can provide for a user of the GUI 300 (e.g. a GC) formatting the GUIs 400 and 500. Via the GUI 300, any of the displayed components or any other formatting for the GUIs 300, 400, and 500 may be set via the GUI 300.

The first device 106 may be any computing device (e.g., a mobile device, a laptop device, a tablet device, or any other computing device). The first device 106 can include a plurality of devices. The first device 106 can include one or more devices configured to receive data for display of a GUI provided by the GUI management circuit 124. The client device 106 may include a processor 126, and a memory 128. The processor 126 may include one or more microprocessors, application-specific integrated circuits (ASIC), a field-programmable gate arrays (FPGA), etc., or combinations thereof. The memory 128 may include, but is not limited to, electronic, magnetic, or any other storage or transmission device capable of providing processor with program instructions. The memory may include magnetic disk, memory chip, read-only memory (ROM), random-access memory (RAM), Electrically Erasable Programmable Read-Only Memory (EEPROM), erasable programmable read only memory (EPROM), flash memory, or any other suitable memory from which processor can read instructions. The memory 128 may include components, subsystems, data structures, modules, scripts, applications, or one or more sets of processor-executable instructions for displaying a GUI, such as any GUI described herein. For example, the memory 128 may include an application configured to access an application server that provides the GUI. The first device may also include a display circuit 130 configured to display the GUI. For example, the display circuit may be configured to display the GUI on a touch screen, OLED screen, LCD screen, LED screen, or any other type of screen or surface of the first device 106.

The second device 108 and the third device 110 may include any of the features described above for the first device 106. In some embodiments described herein, the first device 106 is described as being used by a manager (e.g. a GC), the second device 108 is described as being used by a task manager (e.g. an SC), and the third device 110 is described as being used by a director. However, in other embodiments, any appropriate user or operator may use the devices 106, 108, and 110 to perform or to make use of processes described herein.

The client application 142 may include components, subsystems, data structures, modules, scripts, applications, or one or more sets of processor-executable instructions for implementing a transaction, such as a payment transaction or other transaction. The client application 142 may include, for example, a web browser. The client application 142 may include, for example, a mobile application. The client application 142 may be configured to transmit a request for a transaction (e.g., a financial transaction), the request including transaction information and an account number (e.g., the alias account number 128). The client application 142, or another application executed by the client device 106, may be configured to receive a verification challenge (e.g., from the transaction verification circuit 120 or from the payment processor 136), and may be configured to transmit a response to the verification challenge (e.g., to the transaction verification circuit 120 or to the payment processor 136).

The client application 142, or another application executed by the client device 106, may be configured to provide a graphical user interface (GUI), FIG. 3, FIG. 4, and FIG. 5 show example GUIs provided by the GUI management circuit 124 in detail. FIG. 3 shows a manager GUI 300. In some embodiments, the manager GUI 300 may be provided by the GUI management circuit 124 to a device used by a GC. The GC may thus have access to centralized control platform for managing projects, jobs and tasks, and progress and payments related thereto. The manager GUI 300 may request that credentials be entered, and upon entry and confirmation of the credentials, may display a screen depicted in FIG. 3. The manager GUI 300 displays a job selection object that provides for selecting a job from a list of one or more jobs, including the job 204*a*. In some embodiments, the GUI formatting circuit 210 may identify a plurality of task managers associated with the plurality of jobs, and may transmit an indication of the plurality of managers for display via the GUI 300. The GUI formatting circuit 210 may display the jobs ordered by task manager (e.g. to display the list of the one or more jobs as a plurality of sub-lists, each sub-list associated with a respective task manager).

The GUI 300 may also include a task selection object for display and selecting one or more tasks 302, including a task 302*a* (a "drywall" task in the depicted example) and a task 30*b* (a "painting" task in the depicted example). The task 302*b* is shown as collapsed in FIG. 3, and a title or name of the task 302*b* is displayed next to a selectable object that, when selected (e.g. clicked via a mouse, touched via a touch screen, or otherwise selected) provides an expanded view of the task 302*b*. The task 302*a* is shown in the expanded view. In some embodiments, the name or identity of a party assigned to, responsible for, or working on the task 302*a* may be shown adjacent to the title of the task 302*a*—in the depicted example a "task manager 1" (e.g. an SC) is assigned to the drywall task 302*a*.

The manager GUI 300 includes the task progress display gauge 304 which, in the depicted example, is specific to the task 302. The manager GUI 300 may include a task progress display gauge for any of the tasks 302. The task progress display gauge 304 is configured to show specific information in a specific format the environment of the manager GUI 300 to facilitate tracking progress, directing funds as appropriate, and providing ready access to relevant information to specific parties. Thus, the task progress display gauge 300 can be configured by the GUI formatting circuit 210 to display specific information in a readily digestible format, which alleviates the burden of having to scroll through multiple pages of a conventional ledger. The task progress display gauge 304 can be updated in real time, which alleviates any uncertainty of whether the information presented is up to date, which is a recurring problem in conventional ledgers.

The task progress display gauge 304 can include one or more sub-tasks for the task 302*a*. In the depicted example, the task progress display gauge 304 includes a "labor" sub-task 306*a* and a "supplies" sub-task 306*b*. By dividing the task 302*a* into sub-tasks 306, the task progress display gauge 304 can divide the task 302 into components that are commonly billed separately and that may involve separate considerations with regard to transfers of funds. It may thus be especially advantageous to track progress on those components of the task 302 separately, and the task progress display gauge 304 provides for this. As shown in FIG. 3, each subtask 306 can include a progress gauge 308 that depicts (1) a progress of the sub-task 306, and (2) an amount paid for the sub-task 306. The display of that information provides relevant information to the party using the manager GUI 300.

In the depicted embodiment, the progress gauge 308*a* displays a progress of the labor sub-task 308*a* on a progress bar having four quadrants. The quadrants are disposed between ordered (e.g. increasing or decreasing by constant amounts, or differing according to a predetermined formula) progress benchmarks of 0%, 25%, 50%, 75% and 100% (e.g. as specified in the job 204*a* stored in the memory 120). In other embodiments, other benchmarks may be used, or benchmarks may be omitted from the progress bar. In the depicted example, the current progress of the sub-task 306*a* is 50% completion, and the progress bar displays the current progress via a first indicator (in the depicted example, via a solid or dark colored bar indicator). The progress bar also displays a proposed progress of 75% via a second indicator (in the depicted example, via a transparent, partially transparent, or lighter colored bar indicator). The proposed progress may be submitted by a task manager (e.g. the SC) via a GUI 400 shown in FIG. 4, described in more detail below. The proposed progress may be processed by the budget updating circuit 206, which may store an updated job 204*a* that includes the proposed progress in the memory 120. When formatting or generating the GUI 300, the GUI formatting circuit 210 may reference the proposed progress and depict the proposed progress via the second indicator on the progress bar.

The progress gauge 308*a* includes a selectable confirmation object 310*a* that provides for a user of the GUI 300 confirming the proposed progress. For example, the selectable confirmation object 310*a* may be selected via a mouse click, a touch on a touch screen, or otherwise, and may provide an option to confirm the proposed progress, such as via a drop down menu or via a pop-up notification. In some embodiments, the selectable confirmation object 310*a* may be a click-to-confirm object that, when clicked, confirms the proposed progress (with, in some embodiments, selection of an additional confirmation prompt that confirms that the user meant to select the selectable confirmation object 310*a*). In some embodiments, the confirmation object 310*a* provides for refusing to confirm a proposed progress, and may trigger a process to transmit a notification (e.g. via the GUI formatting circuit) to a user of the GUI 400 that the proposed progress was refused confirmation.

In some embodiments, the confirmation object 310*a* thus provides for a GC monitoring a proposed progress submitted by an SC. In certain projects (e.g. construction jobs), the GC relies on, or makes use of, progress reports and status updates provided by the SC. The GC may confirm the progress reports at their convenience (e.g. via checking the construction site to verify the progress, via a conversation with the SC, or based on the progress update being received at an expected time and/or reflecting an expected progress). Thus the SC, who may have progress information readily available, can keep the GC apprised of updates in real time, and the GC may implement their own verification procedure to confirm the proposed progress.

The progress gauge 308*a* also displays an amount paid for the labor sub-task 308*a* on a payment bar having four quadrants. The payment bar may be an example of a payment display object, which can include any object that display payment information (e.g. relating to an amount paid (cumulative or yet-to-be-paid) or an amount owed). The quadrants are disposed between ordered payment benchmarks of 5 thousand dollars (K), 10K, 15K, and 20K of a total 20K amount to be paid out (e.g. as specified in the job 204*a* stored in the memory 120). The amount paid may be submitted by a manager (e.g. the GC) via the GUI 300 In other embodiments, other benchmarks may be used, or benchmarks may be omitted from the progress bar. In the depicted example, the current amount paid for the sub-task cis 10K/20K, and the payment bar displays the current amount paid via a first indicator (in the depicted example, via a solid or dark colored bar indicator). A second indicator (in the depicted example, a transparent, partially transparent, or lighter colored bar indicator) may indicate an amount owed (e.g. a cumulative amount owed for the sub-task 306*a*, or a remaining amount owed (a difference between an amount paid and the cumulative amount owed)). In other embodiments, the second indicator may indicate a potential amount owed determined based on a yet-to-be confirmed proposed progress. The amount owed may be determined by the budget updating circuit 206, and as described above, may be based on a payment schedule and/or based on a progress of the sub-task 306a. In some embodiments, once the proposed progress is confirmed via the selectable confirmation object 310a, the budget updating circuit 206 updates the current progress for the job 204a and determines an updated amount owed based on the updated current progress, and the GUI formatting circuit 210 uses the updated amount owed to generate or format the GUI 300 to show the updated amount owed via the second indicator.

The progress gauge 308a also includes an optional selectable amount paid update object 310b for updating the amount paid. In some embodiments, the user of the manager GUI 300 (e.g. the GC) may update the amount paid by, for example, setting (e.g. sliding or clicking to a location on the payment bar) one of the first indicator and the second indicator to a new amount paid, and selecting the selectable amount paid update object 310b. For example, this may be convenient if a payment is made using cash or other non-electronic payment means. The updated amount paid may be processed by the budget updating circuit 206, and the budget 202 may be updated. In other embodiments, the selectable amount paid update object 310b for updating the amount paid may be omitted.

The task progress display gauge 304 may also include a progress gauge 308b for the supplies sub-task 306b. The progress gauge 308b may be similar to the progress gauge 308a in certain regards. The progress gauge 308b may include a payment bar indicating an amount spent. As discussed above, the amount spent may be an amount spent on supplies or other goods or services, and may be for goods or services for which a purchaser (e.g. the SC) is entitled to reimbursement according to the budget 202. Similar to the proposed progress, the payment bar for the amount spent may be divide into quadrants by benchmarks, and may display a proposed amount spent (e.g. submitted by the SC via the GUI 400). The progress gauge 308b may include a selectable confirmation object 312a for confirming the proposed amount spent. The progress gauge 308b may also include a payment bar for an amount paid for the sub-task 306b, similar to the payment bar for the amount paid for the sub-task 306a. The progress gauge 308b may further include a selectable confirmation object 312b for confirming the amount paid for the sub-task 306b.

In some embodiments, the GUI 300 can also include a total funding received indicator 304 and a total amount paid out indicator 306. The total funding received indicator 304 may indicate total funding received from the director, and can be compared to the total amount paid displayed by the total amount paid out indicator 306 to readily determine whether the manager has been provided with funds that are to be directed to the task manager. In other embodiments, the total funding received indicator 304 and a total amount paid out indicator 306 may be omitted. The GUI 300 may also indicate a total budget or total amount to be paid for a job, task, or sub-task.

Thus the task progress display gauge progress 304 can be used to conveniently and readily inform a user of a current progress of a task, and can be used to provide real time information at a granular level (e.g. for specific sub-tasks). By presenting the highly relevant information described above, in contrast to conventional ledgers, the task progress display gauge progress 304 can provide ready access to the most relevant information to the user of the GUI 300 including real time updates from a task manager, and can provide for an efficient confirmation process for confirming proposed updates from the task manager.

Referring now to FIG. 4, FIG. 4 shows a task manager GUI 400. The task manager GUI 400 displays a list of one or more jobs, including the job 204a, and a task 402a to which the user of the GUI 400 is assigned. The list of one or more jobs may be arranged by manager (e.g. may include one or more sub-lists, each sub-list corresponding to one manager of the plurality of managers), which can provide for improved navigation of job information for a task manager performing tasks for a plurality of managers. In the depicted example, the job 204a corresponds to a manager 1. The task manager GUI 400 can provide for a sign-in process in which the user submits credentials via the GUI 400, the GUI 400 transmits the credentials to the GUI management circuit 124, and the GUI management circuit verifies the credentials and responsively provides a screen of the GUI 400, as depicted in FIG. 4.

The task manager GUI 400 may include or display a task progress display gauge 404. The task progress display gauge 404 may be similar in certain regards to the task progress display gauge 304. The task progress display gauge 404 may include a list of tasks 402, including the task 402a, and the task 402a may include sub-tasks 406, including sub-task 406a (a labor subtask) and a sub-task 406b (a supplies sub-task). The task 402a and the sub-tasks 406a and 406b may correspond to the task 302a and the sub-tasks 306a and 306b, and in some embodiments may the same tasks and sub-tasks. In some embodiments, the task 402a and the sub-tasks 406a and 406b may be associated with different task IDs than those of the task 302a and the sub-tasks 306a and 306b, which can be used by the GUI management circuit 124 to distinguish between, for example, a GC's view (the task 302a) and an SC's view (the task 402a) of certain tasks, and to perform operations accordingly.

The task progress display gauge 404 may include a progress gauge 408a and a progress gauge 408b, which may be similar to the progress gauges 308a and 308b of the GUI 300. The progress gauge 408a displays a progress of the labor sub-task 406a on a progress bar, the progress gauge 408b displays a progress of the supplies sub-task 406b on a progress bar, and both progress bars display an amount paid. A total budget or amount to be paid may be displayed by the progress gauges 408a and 408b, and in some embodiments that amount for the GUI 400 may be different than an amount displayed by the GUI 300. For example, the total budget displayed by the GUI 300 for a task or sub-task may indicate a total amount of funds to be paid by a director or payor to a GC using the GUI 300, and the total budget displayed by the GUI 400 for a task or sub-task may indicate a total amount of funds to be paid by the GC to an SC using the GUI 400. Those amounts may differ by, for example, a portion of the funds that are designated as payment to the GC or a receivable by the GC for services rendered or for expenses. Thus the GC may be provided with a display that facilitates a full vision of the distribution of funds for a project, while the SC may be provided with information relevant to the GC, and in some embodiments, information privy to the GC and not to the SC may not be provide to the SC.

The task progress display gauge 404 may also include a selectable proposed progress reporting object 410a, and a selectable spending update object 410b. The proposed progress reporting object 410a may be used by a user of the GUI 400 to report or submit a proposed progress. Upon submission to the GUI input circuit 214, the proposed progress may be routed to the budget management circuit 122 for updating the budget and, in some embodiments, for alerting a user of the GUI 300 via the GUI 300 or via another medium (e.g. via a push notification, email, in-application notification, phone call, or other method). Once the budget is updated, the GUI formatting circuit may provide an indicator on the progress bar of the progress display gauge 408a that indicates the proposed progress, similarly to the corresponding indicator described above with respect to the progress gauge 308a. The spending update object 410b may similarly submit a spending update, or a proposed spending update (e.g. for budgets that include a protocol for confirming spending updates).

Thus, the GUI 400 provides for a specific environment and display for use by a task manager that provides for relevant and selected information (e.g. that may provide relevant information to the task manager, and may omit certain information such as information regarding portions of funding that are designated for the manager). The GUI 400 also provides the task manager with a convenient and easy to navigate environment for submitting progress reports.

Referring now to FIG. 5, FIG. 5 shows a director GUI 500. The director GUI 500 displays a list of one or more jobs, including the job 204a, and a tasks 502a and 502b which the user of the GUI 500 is directing. In some embodiments, the list of one or more jobs may be arranged by manager (e.g. may include one or more sub-lists, each sub-list corresponding to one manager of the plurality of managers), which can provide for improved navigation of job information for a task manager performing tasks for a plurality of managers. The director GUI 500 can provide for a sign-in process in which the user submits credentials via the GUI 500, the GUI 500 transmits the credentials to the GUI management circuit 124, and the GUI management circuit verifies the credentials and responsively provides a screen of the GUI 500, as depicted in FIG. 5.

The director GUI 500 may include or display a task progress display gauge 504. The task progress display gauge 504 may be similar in certain regards to the task progress display gauge 304. The task progress display gauge 504 may include a list of tasks 502, including the task 502a and 502b, and the task 502a may include sub-tasks 506, including sub-task 506a (a labor subtask) and a sub-task 506b (a supplies sub-task). The task 502a and the sub-tasks 506a and 506b may correspond to the task 302a and the sub-tasks 306a and 306b, and in some embodiments may the same tasks and sub-tasks. In some embodiments, the task 502a and the sub-tasks 506a and 506b may be associated with different task IDs than those of the task 302a and the sub-tasks 306a and 306b, which can be used by the GUI management circuit 124 to distinguish between, for example, a GC's view (the task 302a) and a director's view (the task 502a) of certain tasks, and to perform operations accordingly.

The task progress display gauge 504 may include a progress gauge 508a and a progress gauge 508b, which may be similar to the progress gauges 308a and 308b of the GUI 300. The progress gauge 508a displays a progress of the labor sub-task 506a on a progress bar, the progress gauge 508b displays a progress of the supplies sub-task 506b on a progress bar, and both progress bars display an amount paid. A total budget or amount to be paid may be displayed by the progress gauges 508a and 508b, and in some embodiments that amount for the GUI 500 may be displayed in a different format than an amount displayed by the GUI 300. For example, the progress gauge 508b may display an amount spent as a percentage of a budgeted amount for spending, or as an absolute amount of the budgeted amount for spending (e.g. in dollars in in another unit of currency). In some embodiments, a user of the GUI 300 (e.g. a manager) may prefer that the director be shown the percentage of a budgeted amount for spending on supplies rather than the absolute budgeted amount for spending on supplies because the director may be responsible for a larger amount of funds, of which a portion is directed to the manager for services rendered or expenses, and of which another portion is directed to the task manager purchasing supplies. Thus, the manager may want the director to be able to follow the progress of the spending, but may want to omit an absolute funds amount from the GUI 500, which may not reflect an actual amount spent by the task manager. The GUI 300 may provide for setting the display format of the progress bars of the director GUI 500 or of the task manager GUI 400, which can, for example, facilitate the manager's efforts in this regard. Thus, in some embodiments, a GC may be provided with a display via the GUI 300 that facilitates a full vision of the distribution of funds for a project, while a director may be provided with information relevant to the GC director and in some embodiments, information privy to the GC may not be provide to the director.

The task progress display gauge 504 may also indicate an amount already paid an amount due. For example, the progress bar of the sub-task progress gauge 508a may include a first indicator indicating an amount already paid by the director, and a second indicator indicating an amount due. In some embodiments, the second indicator shows a cumulative amount due, and a difference between the first indicator and the second indicator may show an amount currently due f (e.g. or work completed, or due according to a payment schedule of the budget 202).

The task progress display gauge 504 may also include or omit proposed progress indicators, as appropriate. For example, to provide for a simpler display, or to avoid undesired notifications, the proposed progress indicators may be omitted, and the task progress display gauge 504 may include indicators showing confirmed progress. Thus, the user of the GUI 500 need not be bothered by the resolution of proposed progress reports. In other embodiments, the user of the GUI 500 may want full visibility of the progress reports, and proposed progress indicators may be displayed in the task progress display gauge 504.

The GUI 500 also includes, in some embodiments, a total funding provided indicator 504 and an amount currently due indicator 506. The total funding provided indicator 504 may indicate a total amount of funding provided by the director, cumulatively, for the job 204a. The amount currently due indicator 506 may indicate a total amount currently due, and may inform the director of a payment amount that is pending and, in some embodiments, time-sensitive. This can provide the director with relevant information in a readily accessible manner.

Thus, the GUI 500 provides for a specific environment and display for use by a director that provides for relevant and selected information (e.g. that may provide relevant information to the director, and may omit certain information such as information regarding portions of funding that are designated for the manager).

Figure 6:
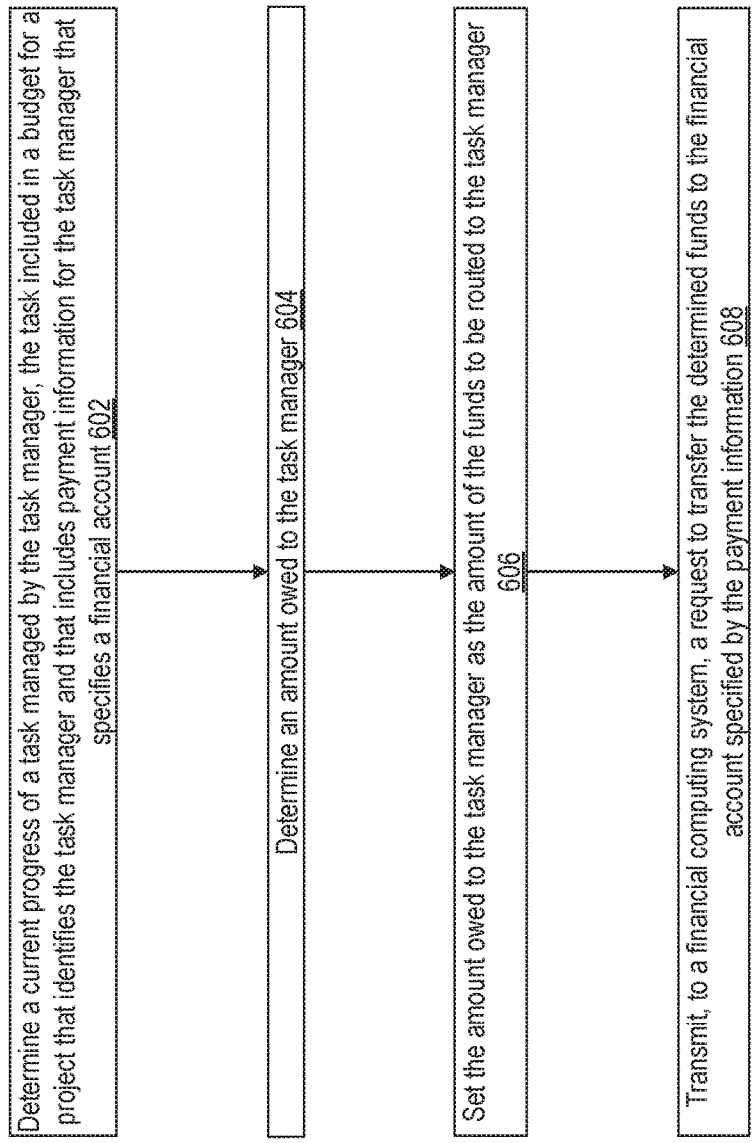
FIG. 6 is a flowchart showing a method for managing a budget, according to an example embodiment.

Referring now to FIG. 6, FIG. 6 is a flowchart of an example method 600 for managing a budget that can be executed by budgeting system 104, according to an example embodiment. The method includes blocks 602 through 608.

In a brief overview, at block 602, the budgeting system 104 may determine a current progress of a task of a project managed by the task manager, the task included in a budget for the project that identifies the task manager and that includes payment information for the task manager that specifies a financial account. At block 604, the budgeting system 104 may determine an amount owed to the task manager. At block 606, the budgeting system 104 may set the amount owed to the task manager as the amount of the funds to be routed to the task manager. At block 608, the budgeting system 104 may transmit to a financial computing system a request to transfer the determined funds to the financial account specified by the payment information.

In more detail, at block 602, the budgeting system 104 may determine a current progress of a task managed by the task manager, the task included in a budget for the project that identifies the task manager and that includes payment information for the task manager that specifies a financial account. For example, this may include a budget management circuit 122 referencing a budget 202 stored in a memory 120 that includes jobs 204, include a job 204 that includes the task and that specifies the task manager. Determining the current progress of the task managed by the task manager may include receiving confirmation of the current progress from a manager specified by the budget 202. This may include a GUI formatting circuit 210 referencing GUI settings 212 corresponding to the budget 202, and the GUI formatting circuit 210 may provide, to a second device 108, a task manager GUI 400 formatted according to the GUI settings 212. The budgeting system 104 may receive, via a progress submission object of the task manager GUI 400, a proposed progress. For example, a user of the GUI 400 may use a selectable proposed progress object 410a to submit a proposed progress to the budgeting system 104 via the GUI input circuit 214.

Determining the current progress may also include the budgeting system 104 providing a GUI to the manager and receiving confirmation via the manager of the proposed progress. For example, the GUI formatting circuit 210 may reference GUI settings 212 corresponding to the budget 202, and the GUI formatting circuit 210 may provide, to a first device 106, a manager GUI 300 formatted according to the GUI settings 212. The GUI 300 may indicate the proposed progress via an indicator on a progress bar of a task progress display gauge 304. The budgeting system 104 may receive, via a confirmation object of the second task progress gauge, confirmation of the proposed progress for the first task. For example, a manager using the GUI 300 may use a selectable progress confirmation object 310a to confirm the proposed progress, and the budgeting system 104 may receive the confirmation via the GUI input circuit 214.

At block 604, the budgeting system 104 may determine an amount owed to the task manager, and at block 606, the budgeting system 104 may set the amount owed to the task manager as the amount of the funds to be routed to the task manager. For example, the amount owed may be calculated by a budget management circuit 122 of the budgeting system 104. The amount owed may be specific to a job or task of the budget 202 and may be based on, for example, a difference between an amount spent and an amount paid, or based on a predetermined payment schedule. In some embodiments, the amount owed may be a cumulative amount owed (e.g. for the entire projection, or for a portion of the project), or may be a remaining amount owed (e.g. a difference between an amount paid and the cumulative amount owed).

In some embodiments, the budgeting system 104 determines the amount owed responsive to an invoicing trigger. For example, the invoicing trigger may include funds being deposited into a project financial account. In some embodiments, an invoicing circuit 208 of the budgeting system 104 may monitor (e.g. by checking at predetermined intervals) a timeline of one or more of the jobs 204, and may generate or determine to transmit an invoice based on the timeline (e.g. based on scheduled payment times specified by the timeline). The generation of the invoice may serve as the invoicing trigger, in some embodiments. The invoicing circuit 208 may also monitor benchmarks of the one or more jobs 204, and may generate or determine to transmit an invoice based on a benchmark having been reached. In some embodiments, a budget updating circuit 206 informs the invoicing circuit 208 when a benchmark has been reached (e.g., the budget updating circuit 206 determines whether a benchmark has been reached each time a progress update is made, and if so, informs the invoicing circuit), and the invoicing circuit 208 responsively generates an appropriate invoice.

At block 608 may the budgeting system 104 may transmit to a financial computing system a request to transfer the determined funds to the financial account specified by the payment information. For example, the invoicing circuit 208 may transmit a transaction request to a financial computing system 102's account management circuit 116, which can cause the account management circuit 116 to route a payment to a financial account specified in the transaction request. The financial computing system 102 may transmit a confirmation of payment to the budgeting system 104, and the budgeting system 104 may update the budget 202 accordingly.

Figure 7:
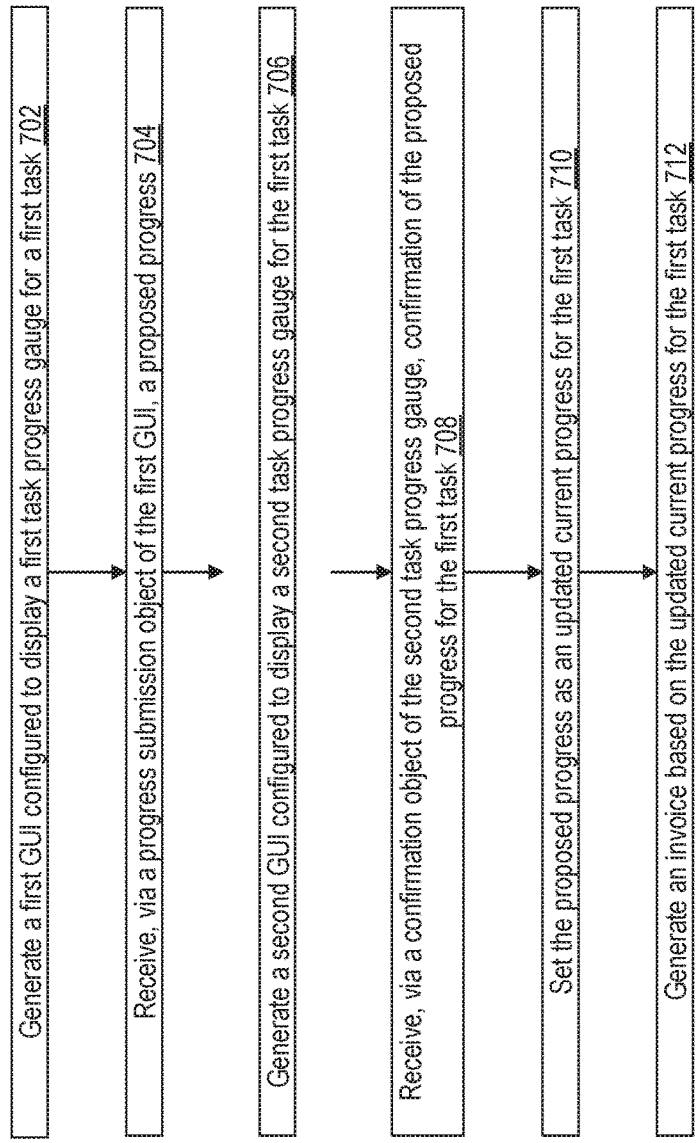
FIG. 7 is a flowchart showing a method for managing a budget, according to an example embodiment.

Referring now to FIG. 7, FIG. 7 is a flowchart of an example method 700 for managing a budget that can be executed by budgeting system 104, according to an example embodiment. The method includes blocks 702 through 712. In a brief overview, at block 702, the budgeting system 104 may generate a first GUI configured to display a first task progress gauge for a first task. At block 704, the budgeting system 104 may receive, via a progress submission object of the first GUI, a proposed progress. At block 706, the budgeting system 104 may generate a second GUI configured to display a second task progress gauge for the first task. At block 708, the budgeting system 104 may receive, via a confirmation object of the second task progress gauge, confirmation of the proposed progress for the first task. At block 710, the budgeting system 104 may set the proposed progress as an updated current progress for the first task. At block 712, the budgeting system 104 may generate an invoice based on the updated current progress for the first task.

In more detail, at block 702, the budgeting system 104 may generate a first GUI configured to display a first task progress gauge for a first task of a budget. The budgeting system 104 may determine the budget that includes one or more tasks including the first task. This may include the budget management circuit 122 referencing the budget 202 stored in the memory 120 that includes the jobs 204. Furthermore, a GUI formatting circuit 210 may reference GUI settings 212 corresponding to the budget 202, and the GUI formatting circuit 210 may provide, to a second device 108, a task manager GUI 400 formatted according to the GUI settings 212.

At block 704, the budgeting system 104 may receive, via a progress submission object of the first GUI, a proposed progress. For example, a user of the GUI 400 may use a selectable proposed progress object 410*a* to submit a proposed progress to the budgeting system 104 via the GUI input circuit 214.

At block 706, the budgeting system 104 may generate a second GUI configured to display a second task progress gauge for the first task, the second task progress gauge including a display of the current progress of the first task and a display of the proposed progress. For example, the GUI formatting circuit 210 may reference GUI settings 212 corresponding to the budget 202, and the GUI formatting circuit 210 may provide, to a first device 106, a manager GUI 300 formatted according to the GUI settings 212. The GUI 300 may indicate the proposed progress via an indicator on a progress bar of a task progress display gauge 304.

At block 708 the budgeting system 104 may receive, via a confirmation object of the second task progress gauge, confirmation of the proposed progress for the first task. For example, a manager using the GUI 300 may use a selectable progress confirmation object 310*a* to confirm the proposed progress, and the budgeting system 104 may receive the confirmation via the GUI input circuit 214.

At block 710, the budgeting system 104 may set the proposed progress as an updated current progress for the first task. For example, the budget updating circuit 206 may update the current progress of a job 204*a* of the budget 202 to be the proposed and confirmed progress. At block 712, the budgeting system 104 may generate an invoice based on the updated current progress for the first task. The budgeting system 104 may also route payment to a financial account for the invoice, and update the budget. For example, the invoicing circuit 208 may determine an amount owed based on the updated progress and according to the budget 202, and may transmit a transaction request to a financial computing system 102's account management circuit 116, which can cause the account management circuit 116 to route a payment to a financial account specified in the transaction request. The financial computing system 102 may transmit a confirmation of payment to the budgeting system 104, and the budgeting system 104 may update the budget 202 accordingly.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

In embodiments described herein, one or more processors may execute instructions stored in memory or may execute instructions otherwise accessible to the one or more processors. Reference to "a processor" made herein can refer to a single processor, or to a plurality of processors that are communicatively coupled. The plurality of processors need not be located in proximity to each other or at a same facility. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In some example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc.

An example system for implementing the overall system or portions of the embodiments might include general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In some embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick, a touch screen, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (including, for example, cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments.

Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method for managing budgets, comprising: generating, by a project management system, a first graphical user interface (GUI) configured to display a first task progress gauge for a first task of one or more tasks of a budget, the first task progress gauge including a display of a current progress of the first task and a progress submission object configured to receive a proposed progress for the first task; transmitting, by the project management system to a remote computing system via a network, instructions that cause the remote computing system to display the first GUI on a display device of the remote computing system; receiving, by the project management system via the network, the proposed progress entered via the progress submission object of the first GUI displayed on the display device of the remote computing system; generating, by the project management system, a second GUI configured to display a second task progress gauge for the first task, the second task progress gauge including a display of the current progress of the first task and a display of the proposed progress, and further including a confirmation object configured to receive confirmation of the proposed progress; transmitting, by the project management system to the remote computing system, second instructions that cause the remote computing system to display the second GUI on the display device of the remote computing system; receiving, by the project management system via the network, the confirmation of the proposed progress for the first task based on an interaction with the confirmation object displayed on the display device of the remote computing system; setting, by the project management system, the proposed progress as an updated current progress for the first task; generating, by the project management system, an invoice based on the updated current progress for the first task; generating, by the project management system, a third GUI configured to (i) receive user credentials for a director, and (ii) display a third task progress gauge for the first task, the third task progress gauge including a display of the current progress of the first task and of a first amount paid by the director for the first task, wherein the first task progress gauge and the second task progress gauge are configured to display the first amount paid for the first task;

and transmitting, by the project management system to the remote computing system, third instructions that cause the remote computing system to display the third GUI on the display device of the remote computing system.

2. The method of claim 1, wherein: the first task is associated with an ordered plurality of progress benchmarks, a first budget for the first task includes a plurality of installments respectively corresponding to the ordered plurality of progress benchmarks, and generating the invoice comprises determining a highest benchmark of the ordered plurality of progress benchmarks that has been met by comparing one or more of the ordered plurality of progress benchmarks to the updated current progress for the first task.

3. The method of claim 1, wherein: the first GUI is further configured to display a budget adjustment object, the budget adjustment object configured to receive a budget adjustment for the first task, and the confirmation object is further configured to receive the confirmation of the budget adjustment.

4. The method of claim 3, further comprising identifying, by the project management system, a plurality of jobs associated with the user credentials and transmitting an indication of the plurality of jobs to a device for display via the first GUI, wherein: the first GUI is configured to display a job selection object configured to display a list of the plurality of jobs, and to receive a selection of at least one of the plurality of jobs, and the first task is included in the selected at least one of the plurality of jobs.

5. The method of claim 4, further comprising identifying a plurality of managers associated with the plurality of jobs associated with the user credentials, and transmitting an indication of the plurality of managers to the device, wherein the job selection object is configured to display the list of the plurality of jobs as a plurality of sub-lists, each sub-list associated with a respective manager of the plurality of managers.

6. The method of claim 1, wherein the second GUI includes a payment display object is configured to receive, for the display of the first amount paid for the first task by the third task progress gauge, a selection of a percentage-based display format and a selection of an absolute amount paid display format.

7. The method of claim 6, wherein the first task progress gauge is configured to receive user credentials corresponding to a financial account, and wherein the first task progress gauge is further configured to display a second amount paid to the financial account, the second amount paid being different from the first amount paid.

8. The method of claim 7, the first task progress gauge is configured to display the second amount paid for the first task in the absolute amount paid display format.

9. A system for managing budgets, comprising: a graphical user interface (GUI) management circuit configured to: generate a first GUI configured to display a first task progress gauge for a first task of a budget that includes one or more tasks, the first task progress gauge including a display of a current progress of the first task and a progress submission object configured to receive a proposed progress for the first task; transmit, to a remote computing system via a network, instructions that cause the remote computing system to display the first GUI on a display device of the remote computing system; receive, via the network, the proposed progress entered via the progress submission object of the first GUI displayed on the display device of the remote computing system; generate a second GUI configured to display a second task progress gauge for the first task, the second task progress gauge including a display of the current progress of the first task and a display of the proposed progress, and further including a confirmation object configured to receive confirmation of the proposed progress; transmit second instructions that cause the remote computing system to display the second GUI on the display device of the remote computing system; receive, via the network, the confirmation of the proposed progress for the first task based on an interaction with the confirmation object displayed on the display of the remote computing system; generate a third GUI configured to (i) receive user credentials for a director, and (ii) display a third task progress gauge for the first task, the third task progress gauge including a display of the current progress of the first task and of a first amount paid by the director for the first task, wherein the first task progress gauge and the second task progress gauge are configured to display the first amount paid for the first task; and transmit third instructions that that cause the remote computing system to display the third GUI on the display device of the remote computing system, and a budget management circuit configured to: set the proposed progress as an updated current progress for the first task; and generate an invoice based on the updated current progress for the first task.

10. The system of claim 9, wherein the first task progress gauge is further configured to display the current progress of the first task via a first indicator showing a progress confirmed via the second GUI, and to display the proposed progress via a second indicator.

11. The system of claim 9, wherein the first task progress gauge is further configured to display an amount paid for the first task and a total budget for the first task.

12. The system of claim 9, wherein the second task progress gauge is configured to: receive user credentials; identify a plurality of jobs associated with the user credentials, each job including at least one of the one or more tasks; identify a plurality of task managers associated with the plurality of jobs; and display a list of the plurality of jobs as a plurality of sub-lists, each sub-list associated with a respective task manager of the plurality of task managers.

* * * * *